United States Patent [19]

Louis et al.

[11] 4,072,655
[45] Feb. 7, 1978

[54] ORGANOSILICON COMPOUNDS AS ADDITIVES FOR CURABLE ORGANOPOLYSILOXANE COMPOSITIONS

[75] Inventors: Eckhart Louis, Burghausen; Norman Dorsch, Fuchshausen; Ernst Wohlfarth, Burghausen, all of Germany

[73] Assignee: Wacker-Chemie GmbH, Munich, Germany

[21] Appl. No.: 648,429

[22] Filed: Jan. 12, 1976

[30] Foreign Application Priority Data

Jan. 15, 1975  Germany .............................. 2501441

[51] Int. Cl.$^2$ .............................................. C08G 77/04
[52] U.S. Cl. ........................... 260/46.5 G; 260/37 SB; 260/46.5 E; 428/447
[58] Field of Search ...................... 260/46.5 G, 46.5 E

[56] References Cited

U.S. PATENT DOCUMENTS

| 3,184,427 | 5/1965 | Russell et al. .................. 260/46.5 G |
| 3,328,340 | 6/1967 | Vaughn, Jr. ..................... 260/46.5 G |

*Primary Examiner*—Melvyn I. Marquis

[57] ABSTRACT

Organosilicon compounds having at least one hydrocarbon radical linked to at least 75 percent of the silicon atoms via an oxygen atom in which the hydrocarbon radical has at least one hydroxyl group and may be linked again to the same silicon atom or to another silicon atom via an oxygen atom are added to room temperature curable organopolysiloxane compositions to form compositions which are resistant to flow on vertical surfaces. When these compositions are exposed to atmospheric moisture at room temperature, they form elastomers having decreased Shore hardness and modulus on the surface in contact with the substrate as compared to the surface exposed to atmospheric moisture.

9 Claims, No Drawings

ORGANOSILICON COMPOUNDS AS ADDITIVES FOR CURABLE ORGANOPOLYSILOXANE COMPOSITIONS

This invention relates to improved organopolysiloxane compositions, particularly to organopolysiloxane compositions which are stable in the absence of atmospheric moisture, but when exposed to atmospheric moisture cure at room temperature to form elastomers having improved properties.

Organopolysiloxane compositions which are stable in the absence of moisture but cure to elastomeric solids when exposed to atmospheric moisture are well known in the art. For example, French Pat. No. 2,080,523 discloses an organopolysiloxane composition containing diorganopolysiloxanes having condensable terminal groups and cross-linking agents containing at least three amino groups and/or acylated amino groups and/or oximo groups. Compared to other compositions, containing for example acyloxy groups instead of amino and/or acylated amino groups and/or oximo groups, these compositions can be cured in the presence of atmospheric moisture without forming corrosive compounds. Likewise, organopolysiloxane compositions containing diorganopolysiloxanes having acyloxy or amino groups in each of the terminal units and aluminum alkoxy compounds such as described in French Pat. No. 1,537,643 can also be cured in the presence of atmospheric moisture without forming corrosive compounds. In contrast to the organopolysiloxanes which contain the additives of this invention, the organopolysiloxane compositions known heretofore which may also be resistant to flow and which consist of organopolysiloxanes having condensible groups and, for example, organosilicon cross-linking agents which have at least three amino groups and/or acylated amino groups and/or oxime groups are not stable towards hydrolysis.

Furthermore, the organopolysiloxane compositions known heretofore which can be stored in the absence of atmospheric moisture and cure in the presence of atmospheric moisture to form elastomers, have a Shore hardness, modulus and ratio of elasticity to plasticity which remains the same throughout all the cross section between the surfaces which are in contact with the applied substrate and the atmosphere. In many applications however, particularly in the sealing of joints or fissures between moving parts and/or parts whose dimensions vary under changing temperature conditions or when it is desired to coat surfaces with slits whose dimensions change with the temperature or when fissures do in time develop subsequent to coating, it is advantageous to employ elastomers whose Shore hardness and modulus decreases at the substrate surface as long as the elastomers remain in contact with the surfaces on which they have been applied. Elastomers having decreasing Shore hardness and modulus are especially advantageous because these elastomers exhibit increased plasticity when subjected to dynamic stress. For example, when these elastomers are used for sealing gaps, the increased values of plasticity within the elastomers result in a smaller tensile stress exerted on the joint sides when the gaps widen, whereas the surfaces of the elastomers which are directly exposed to the atmosphere are protected from mechanical damage due to their high elasticity. When such elastomers are used as coatings, they can be torn near the surface on which they are applied without any adverse results or they can detach from their base in a sliding movement without the entire cross section of the coating being torn throughout the coating's thickness in the event that fissures which existed prior to application of the coating or which have formed in the substrate subsequent to coating should widen and become longer. Thus, the compositions of this invention are not only highly resistant to flow, but also produce elastomers whose Shore hardness, modulus and ratio of elasticity to plasticity decreases when subjected to dynamic stresses while the elastomers are in contact with the substrates on which they have been applied. These compositions thus provide certain advantages which are not available in previously known organopolysiloxane compositions.

Therefore, it is an object of this invention to provide organopolysiloxane compositions which are resistant to flow when applied to vertical surfaces. Another object of this invention is to provide organopolysiloxane compositions which are stable in the absence of moisture, but cure to an elastomeric solid when exposed to atmospheric moisture. Another object of this invention is to provide organopolysiloxane compositions which upon "cross-linking" or "vulcanization" do not release corrosive compounds. Still another object of this invention is to provide elastomers which are resistant to hydrolysis. A further object of this invention is to provide elastomers whose Shore hardness and modulus are lower on the surface of the substrate on which they are applied than on the surface exposed to atmospheric moisture.

The foregoing objects and others which will become apparent from the following description are accomplished in accordance with this invention, generally speaking, by providing organosilicon compounds which can be added to room temperature curable organopolysiloxane compositions to form elastomeric solids. In the organosilicon compounds, which are employed as additives in curable organopolysiloxane compositions, at least 75 percent of the silicon atoms are linked via an oxygen atom to a hydrocarbon radical containing one or two hydroxyl groups and/or the hydrocarbon radical may be linked again via an oxygen atom to the same silicon atom or to a different silicon atom. The organosilicon compounds or additives are added to organopolysiloxane compositions containing diorganopolysiloxanes having condensable terminal groups and cross-linking agents having at least 3 amino groups and/or acylated amino groups which are linked to the silicon atom via a nitrogen atom and/or oximo groups which are linked to a silicon atom via an oxygen atom per molecule.

In the silicon compounds, at least 75 percent of the silicon atoms are linked via an oxygen atom to a hydrocarbon radical containing one or two hydroxyl groups and/or the hydrocarbon radical may be further linked via an oxygen atom to the same and/or different silicon atom. Moreover, it is preferred that the lowest possible number of hydrocarbon radicals be linked a second time to the same and/or at least one other silicon atom so that each of the hydrocarbon radicals which are not linked to a silicon atom via oxygen contains one or two hydroxyl groups. The silicon valences which are not linked to a hydrocarbon radical which is substituted with at least one hydroxyl group, are preferably all saturated with monovalent hydrocarbon radicals or substituted monovalent hydrocarbon radicals having from 1 to 18 carbon atoms. These monovalent hydrocarbon radicals or substituted monovalent hydrocarbon radicals are linked to the silicon atom via SiC-linkages.

Examples of hydrocarbon radicals with which the silicon valences in the organosilicon compounds can be saturated through SiC-bonding are alkyl radicals such as the methyl, ethyl, n-propyl and isopropyl radical as well as the octadecyl radicals; alkenyl radicals such as the vinyl and allyl radicals; alkinyl radicals; cycloaliphatic hydrocarbon radicals such as the cyclopentyl and the cyclohexyl radicals as well as methylcyclohexyl and cyclohexenyl radicals; aryl radicals such as the phenyl radical and xenyl radical; aralkyl radicals such as the benzyl, beta-phenylethyl and the beta-phenylpropyl radical, as well as alkaryl radicals such as the tolyl radical.

The substituted hydrocarbon radicals with which the silicon valences in the silicon compounds can be saturated through an SiC-bond are haloaryl radicals such as chlorophenyl and bromophenyl radicals; perfluoralkylethyl radicals such as the perfluoromethylethyl radical and cyanoalkyl radicals such as the beta-cyanoethyl radical.

It is preferred that 1, 2 or 3 SiC-linked hydrocarbon radicals be present per Si atom in the organosilicon compounds which are employed as additives in this invention.

The hydrocarbon radicals which are linked to silicon via oxygen and which is substituted with one or more hydroxyl groups ar preferably those which correspond to the general formula —OCR'H [C(OH)$_b$R'$_{2-b}$]$_c$ CHR'OH wherein R', which may be the same or different, represents hydrogen, monovalent hydrocarbon radicals or substituted monovalent hydrocarbon radicals having from 1 to 18 carbon atoms, $b$ is equal to 0 or 1 and $c$ is a number of from 0 to 6, with the provision that in no more than one of the units C(OH)$_b$R'$_{2-b}$ can $b$ have a value of 1.

The monovalent and substituted monovalent hydrocarbon radicals represented by R' are the same as those described above for SiC-linked monovalent substituted and unsubstituted hydrocarbon radicals except for the vinyl radical. If in the above formula one unit of the formula C(OH)$_b$R'$_{2-b}$ is present, i.e., where $b$ equals 1, then R' may be the same as described above for SiC-linked monovalent substituted or unsubstituted hydrocarbon radicals except for the vinyl radical. Futhermore, it is preferred that $c$ be a number with a value of from 0 to 4.

The hydrocarbon radicals which are linked to a silicon atom via oxygen and which may be linked again to the same or to at least another silicon atom via an oxygen atom are preferably those corresponding to the above formula in which at least one hydrogen atom of a hydroxyl group is substituted with a silicon atom such as illustrated by the following formula

—SiOCH$_2$CH(OH)CH$_2$OSi—

In accordance with this invention, the organosilicon additives may consist of mixtures of various organosilicon compounds in which at least 75 percent of the silicon atoms are linked via an oxygen atom to at least one hydrocarbon radical which is substituted with one or two hydroxyl groups and may be linked to the same silicon atom or to another silicon atom via an oxygen atom.

These organosilicon compounds having at least 75 percent of the silicon atoms linked via an oxygen atom to at least one hydrocarbon radical which is substituted with one or more hydroxyl groups and may be linked via an oxygen atom to the same silicon atom or to another silicon atom can be prepared by any process known in the art for preparing such compounds.

It is preferred that the organosilicon compounds which are used as additives in this invention be prepared by reacting bivalent or trivalent alcohols especially those corresponding to the general formula

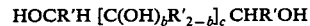
HOCR'H [C(OH)$_b$R'$_{2-b}$]$_c$ CHR'OH where R', $b$ and $c$ are the same as above with silanes corresponding to the general formula

R$_a$SiX$_{4-a}$ wherein R is the same or different and represent substituted and unsubstituted hydrocarbon radicals and X represents halogen such as chlorine, bromine or iodine, preferably chlorine, and $a$ represents 0, 1, 2 or 3, preferably 1, 2 or 3.

Examples of suitable bivalent and trivalent alcohols are ethylene glycol, 1, 2-propylene glycol, trimethylene glycol, 1,2-butylene glycol, 1,3-butylene glycol, 1,4-butylene glycol, 2,3-butylene glycol, pinacon, neopentyldiol, glycerine, trimethylolpropane, 2-methyl-1,4-butanediol, 2,5-dimethyl-3-hexene-2,5-diol and 1,6-hexanediol.

Examples of suitable silanes which correspond to the general formula R$_a$SiX$_{4-a}$ are methyltrichlorosilane, dimethyldichlorosilane, trimethylchlorosilane, phenyltrichlorosilane, vinyltrichlorosilane, n-octadecyltrichlorosilane, phenylmethyldichlorosilane, bromophenyltrichlorosilane, cyclohexyltrichlorosilane, n-propyltrichlorosilane, diphenyldichlorosilane and silicon tetrachloride, as well as bromophenyltribromosilane and cyclohexyltriiodosilane.

The reaction of bivalent or trivalent alcohols with halosilanes is generally known and described, for example, in U.S. Pat. No. 2,906,768 to Haluska.

The organosilicon compounds which are used as additives in accordance with this invention may also be prepared by other processes known in the art. For example, the bivalent or trivalent alcohols can be reacted with silanes corresponding to the general formula R$_a$Si(OR$^1$)$_{4-a}$, where R and $a$ are the same as above and R$^1$ represents an alkyl radical having from 1 to 6 carbon atoms or an aryl radical. Also, the bivalent or trivalent alcohols can be reacted with silanes corresponding to the general formulae R$_a$Si(OOCR$^1$)$_{4-a}$, R$_a$SiH$_{4-a}$, R$_a$Si(NR$_2^3$)$_{4-a}$, where R, R$^1$ and $a$ are the same as above and R$^3$ is the same as R or hydrogen. In addition, these organosilicon compounds can be prepared by reacting bivalent or trivalent alcohols with silanols of the general formula R$_a$Si(OH)$_{4-a}$, in which R and $a$ are the same as above. The bivalent or trivalent alcohols can be reacted with other silylating agents such as, for example, N,N-bis-(trimethylsilyl)formamide or with a mixture of hexamethyldisilazane and trimethylchlorosilane to form the organosilicon compounds.

In all the processes described above for preparing the organosilicon compounds, generally from about 1.0 to 1.13 mols of bivalent or trivalent alcohols are used for each equivalent of reactive group or for each reactive atom on the silane or silylating agent.

The reaction products obtained from the reaction of the bivalent or trivalent alcohols with halosilanes are illustrated by the general formulae Si(OCH$_2$CH$_2$OH)$_4$, CH$_3$Si(OCH$_2$CH$_2$OH)$_3$, (CH$_3$)$_2$Si(OCH$_2$CH$_2$OH)$_2$,
(CH$_3$)$_3$SiOCH$_2$CH$_2$OH, C$_6$H$_5$Si[OCH$_2$C(CH$_3$)H(OH)]$_3$, CH$_2$=CHSi[O(CH$_2$)$_6$OH]$_3$,
n-C$_{18}$H$_{37}$Si[OCH$_2$C(CH$_3$)$_2$CH$_2$OH]$_3$, (C$_6$H$_5$)CH$_3$Si(OCH$_2$CH$_2$OH)$_2$, BrC$_6$H$_4$Si(OCH$_2$CH$_2$OH)$_3$, (CH$_3$)$_2$Si$\underset{\diagdown O-CH_2}{\overset{\diagup O-CH_2}{}}$CHOH, C$_6$H$_{11}$Si(OCH$_2$CH$_2$OH)$_3$ and the like.

Since the exact nature of the reaction products formed as a result of the reaction of the bivalent or trivalent alcohols with the haolsilanes is not known with certainty, the present invention is not intended to be limited to any particular formula. Analytical data indicates that at least during the reaction of bivalent or trivalent alcohols with halogen silanes, the silicon valences of the resulting products which are not completely saturated via oxygen with hydrocarbon radicals which are substituted with one or two hydroxyl groups and/or are linked a second time via an oxygen atom to the same or different silicon atom, are satisfied with SiC-linked hydrocarbon radicals. In the products thus obtained at least 75 percent of the silicon atoms are linked via oxygen to at least one hydrocarbon radical containing one or two hydroxyl groups or the hydrocarbon radical may be further linked via an oxygen atom to the same or a different silicon atom.

The organosilicon compounds which are used as additives in this invention may be further described as being products obtained from the reaction of one mol of n-propyltrichlorosilane and 3.5 mols of propylene glycol; 1 mol of diphenyldichlorosilane and 2.2 mols of ethylene glycol; 1 mol of trimethylchlorosilane and 1.1 mols of glycerine; 1 mol of trimethylchlorosilane and 1.1 mols of 1,4-butandiol; 1 mol trimethylchlorosilane and 1.1 mols 1,2-propylene glycol.

It is preferred that the organosilicon compounds of this invention be employed in amounts of from 0.05 to 5 percent by weight and more preferably in amounts of from 0.2 to 2 percent by weight based on the total weight of the composition, i.e., the diorganopolysiloxanes, cross-linking agents and the organosilicon compounds which are capable of cross-linking to form elastomers. The term "organosilicon compounds" or organosilicon additives as used herein refers to the total amount of reactants employed in the preparation of the organosilicon compounds used as additives in this invention, i.e., the bivalent or trivalent alcohols and the halosilanes. Thus, it is not essential that the organosilicon compounds used as additives in this invention be separated from the other products obtained as a result of the reaction between the bivalent or trivalent alcohols and the halosilanes.

It is also possible within the scope of this invention to use the same diorganopolysiloxanes containing terminal condensable groups as have been used heretofore in the preparation of organopolysiloxane compositions which can be stored in the absence of moisture but when exposed to moisture cross-link to form elastomers. These organopolysiloxane compositions also contain cross-linking agents having a total of at least 3 amino groups or acylated amino groups which are linked to a silicon atom via nitrogen atom and/or oxime groups which are linked to a silicon atom via an oxygen atom for each molecule. The diorganopolysiloxanes having condensible terminal groups which are mostly used in the preparation of such compositions and which are preferred within the scope of this invention correspond to the following general formula HO[SiY$_2$O]$_x$SiY$_2$OH wherein Y, which is the same or different, represent monovalent hydrocarbon radicals or substituted monovalent hydrocarbon radicals and/or polymeric hydrocarbon radicals and x represents a whole number having a value of at least 10.

These siloxane chains may have other siloxane units in addition to the diorganosiloxane units (SiY$_2$O) along the siloxane chain. These units are generally present as impurities and usually correspond to the formulae YSiO$_{3/2}$, Y$_3$SiO$_{1/2}$ and SiO$_{4/2}$, where Y is the same as above. The amount of such other siloxane units should not, however, exceed more than about 10 percent and preferably the amount should not exceed about 1 mol percent. Other siloxane units such as those corresponding to the general formula —OSiY$_2$R"SiY$_2$O—, where Y is the same as above and R" represents a divalent hydrocarbon radical such as, for example, a phenylene radical can be present in substantial amounts. If desired, the hydroxyl groups in the above indicated formula can be partially or entirely substituted with condensable groups other than Si-linked hydroxyl groups. Examples of such other condensable groups are amino groups which are linked to a silicon atom via a nitrogen atom, oxime groups which are linked to silicon atom via an oxygen atom, alkoxy groups having from 1 to 5 carbon atoms and alkoxyalkylenoxy groups having from 1 to 5 carbon atoms such as the radical of the formula

CH$_3$OCH$_2$CH$_2$O—.

The above indicated examples of Si-linked hydrocarbon radicals and substituted SiC-linked hydrocarbon radicals represented by R are equally applicable for the hydrocarbon radicals represented by Y and unsubstituted polymeric hydrocarbon radicals including the so-called "modified" hydrocarbon radicals such as those derived from a graft polymerization of polymerizable compounds with diorganopolysiloxanes corresponding to the general formula HO[SiR$_2$O]$_x$SiR$_2$OH where R and x are the same as above. Examples of polymerizable compounds are vinyl acetate, acrylic and/or methacrylic acids, acrylic and/or methacrylic acid esters and/or methacrylonitrile.

Although it is preferred that at least 50 percent of the Y radicals be methyl radicals, they may also be phenyl and/or vinyl radicals.

The diorganopolysiloxanes having condensable terminal groups can be either homo or copolymers as well as mixtures of various diorganopolysiloxanes. The viscosity of the diorganopolysiloxanes having condensable terminal groups should be between 100 and 500,000 cSt at 25° C.

It is possible to use organosilicon cross-linking agents which have been employed heretofore to form organopolysiloxanes which are stable in the absence of moisture but are curable to elastomeric solids when exposed to atmospheric moisture. These silicon cross-linking agents have at least 3 amino groups and/or acylated amino groups and/or oximo groups per molecule.

Organosilicon cross-linking agents which have at least 3 amino groups that are linked to a silicon atom via a nitrogen atom per molecule are preferred. Examples of such preferred compounds and silanes corresponding to the general formula $$R_b Si(NH_m R_{2-m}^3)_{4-b'}$$

where R, $R^3$ and $b$ are the same as above and $m$ is 0, 1 or 2 or oligomers resulting from the partial hydrolysis of above aminosilanes.

Except for the vinyl radical, the previously indicated examples of SiC-linked hydrocarbon radicals are equally applicable for the hydrocarbon radicals represented by $R^3$. Additional examples of hydrocarbon radicals represented by $R^3$ are the n-butyl, sec.-butyl and the tert.-butyl radicals. The preferred radicals are sec.-butyl and the cyclohexyl radicals.

Examples of organosilicon cross-linking agents which contain at least 3 oxime groups per molecule which are linked to a silicon atom via an oxygen atom are silanes corresponding to the general formula $R_b Si(ON=X)_{4-b}$, where R and $b$ are the same as above and X is an RR'C group where R and R' are the same as above or an $R^2C$ group where $R^2$ represents a bivalent or substituted bivalent hydrocarbon radical or partial hydrolysates thereof.

Examples of organosilicon cross-linking agents which have a total of at least 3 groups per molecule consisting of amino and oxime groups are silanes corresponding to the general formula $$R_b Si(ON=X)_d (NH_m R_{2-m}^3)_{4-b-d'}$$

where R, $R^3$ and $b$ are the same as above and $d$ is a number of at least 0.5 and not more than 2.9.

Examples of suitable organosilicon cross-linking agents having a total of at least 3 amino groups and/or oximo groups per molecule are methyltris-(n-butylamino)-silane, methyltris-(sec.-butylamino)-silane, methyltris-(cyclohexyl-amino)-silane, methyltris-(methylethylketoximo)-silane, methylbis-)methylethylketoximo)-cyclohexylaminosilane, methyltris (acetonoximo)-silane, a mixture consisting of one part by weight methyltris-(cyclohexylamino)-silane and two parts by weight of methyltris-(acetonoximo)-silane, as well as a mixture consisting of 2 parts by weight of methyltris-(cyclohexylamino)-silane and 3 parts by weight of methyl(methylethylketoximo)-silane.

An example of an organosilicon cross-linking agent having a total of at least 3 acylated amino groups per molecule linked to a silicon atom via a nitrogen atom is methyltris-(benzoylmethylamino)-silane.

Organosilicon cross-linking agents which have for each molecule at least 3 amino groups and/or acylated amino groups linked to a silicon atom via a nitrogen atom and/or 3 oximo groups linked to a silicon atom via an oxygen atom are preferably employed in amounts such that at least 1 mol of said organosilicon cross-linking agent is present for each gram equivalent of the terminal condensable groups present on the diorganopolysiloxanes. Generally from 0.2 to 15 percent by weight and more preferably from 1 to 8 percent by weight based on the total weight of the composition are employed.

Materials other than the diorganopolysiloxanes having terminal condensable groups, the organosilicon cross-linking agents which have at least 3 amino groups and/or acylated amino groups and/or oximo groups linked to a silicon per molecule and the organosilicon additives may be incorporated in the organopolysiloxane compositions of this invention.

Suitable examples of materials which may be incorporated in these compositions are reinforcing as well as non-reinforcing fillers, pigments, soluble dyes, organopolysiloxane resins, organic resins, as well as polyvinyl chloride powders. Other materials which may be added to these compositions are those that tend to improve the adhesion of the finished elastomers to the substrates on which they are applied such as those corresponding to the formula $$CH_3 Si [O(CH_2)_2 NH_2]_2 (CH_2)_3 O(CH_2)_2 NH_2.$$

Materials which enhance the elastomers' electrical properties such as conductive carbon black, corrosion inhibitors, oxidation inhibitors, heat stabilizers, flame repellents, light protective agents, condensation catalysts such as 3-ethoxypropylamino-1, and softeners such as dimethylpolysiloxanes which are end-blocked with trimethylsiloxy groups and which are liquid at room temperature may also be incorporated in the organopolysiloxane compositions of this invention.

When some of the SiC-linked radicals on the diorganopolysiloxanes are alkenyl radicals such as vinyl radicals, it may be advantageous to employ organic peroxides in the organopolysiloxane compositions. These may be employed in amounts of from 0.01 to 5 percent by weight based on the weight of the diorganopolysiloxanes.

Examples of suitable reinforcing fillers, i.e., fillers having a surface area of at least 50 m²/g are pyrogenically produced silicon dioxide (fume silica), silicic acid hydrogels that have been dehydrated while maintaining their structure, as well as pyrogenically produced aluminum oxide and titanium dioxide. It is preferred that such fillers be used in an amount of from 1 to 15 percent by weight based on the total weight of all the organosilicon compounds, i.e., the organosilicon compound employed as the additive and the organopolysiloxanes, present in the composition.

Examples of non-reinforcing fillers, i.e., fillers which have a surface area of less than 50 m²/g, are crushed quartz, diatomaceous earth, siliceous chalk such as Neuburg Chalk, calcium silicate, zirconium silicate and calcium carbonate, for example, in the form of ground chalk and calcinated aluminum silicate. The reinforcing and/or non-reinforcing fillers can be treated with trimethylethoxysilane by any technique known in the art to render them hydrophobic.

Fibrous fillers such as asbestos, glass fibers and/or organic fibers also can be employed in this composition. Likewise, mixtures of various fillers may also be employed.

The various ingredients of the composition can be mixed in any sequence. However, it is preferred that the organosilicon cross-linking agents which have at least 3 amino groups and/or acylated amino groups and/or oxime groups and condensation catalysts if employed, be the last components mixed into the composition. Mixing should be carried out at room temperature in the absence of moisture.

The organopolysiloxane composition can be cured by exposing the composition to atmospheric moisture at room temperature. If desired, curing can be carried out at temperatures higher than room temperature or at temperatures below room temperature, for example, at temperatures of from 5° to 10° C. and/or by increasing the water concentration above that of the atmosphere.

The improved organopolysiloxane compositions of this invention may be used as sealants on horizontal as well as on vertical surfaces. These sealants may be applied to substrates which have gaps of from 10 mm to 50 mm such as occur, for example, in buildings which are constructed of light materials and prefabricated construction components. The improved compositions are also suitable for the preventive and restorative coating of substrates when it is desired to bridge existing or future fissures which occur due to thermal stress, settling and/or shrinkage.

Such substrates may, for example, be parts of hydraulic installations such as sewer pipes, swimming pools and settling basins as well as silos. The compositions can be applied to such substrates by any suitable means such as, for instance, via spraying and/or brush coating. Coats up to several millimeters thick can be applied in a single application. While the preventive and/or restorative coatings known heretofore for such substrates required several applications, the compositions of this invention have the advantage that they can be applied in just one application. It is preferable that the improved compositions of this invention be applied as a coat of from 0.3 to 2 mm in thickness.

Various embodiments of the invention are illustrated in the following examples in which all parts are by weight unless otherwise specified.

EXAMPLE 1

A mixture consisting of 120 parts of a dimethylpolysiloxane having in each of its terminal units an Si-bonded hydroxyl group and having a viscosity of 80,000 cP at 25° C., 80 parts of a trimethylsiloxy endblocked dimethylpolysiloxane which has a viscosity of 35 cP at 25° C., 180 parts of chalk (calcium carbonate) and 20 parts of pyrogenically produced silicon dioxide which has a surface area of 130 m²/g is mixed with 3.0 parts of a product obtained from the reaction of 1 mol trimethylchlorosilane and 1.1 mols of 1,2-propylene glycol. The resultant composition is then mixed with a mixture consisting of 24 parts of methyltris-(sec.-butylamino)-silane and 0.4 part of 3-ethoxypropylamine. The composition thus obtained is stored for 24 hours in tightly sealed tubes. Subsequently samples are removed from the tubes and the flow resistance determined. Also a 5 mm thick coat is applied to a polyvinyl chloride foil and cured in the presence of atmospheric moisture.

EXAMPLE 2

The process described in Example 1 is repeated except that 3.0 parts of the product obtained from the reaction of 1 mol of diphenyldichlorosilane and 2.2 mols of ethylene glycol are substituted for the product obtained from the reaction of trimethylchlorosilane with propylene glycol.

EXAMPLE 3

The process of Example 1 is repeated except that 3.0 parts of the reaction product of 1 mol dimethyldichlorosilane and 2.2 mols of ethylene glycol are substituted for the product obtained from the reaction of trimethylchlorosilane with propylene glycol.

COMPARISON EXAMPLE 1

The process of Example 1 is repeated except that the reaction product from a halosilane and a bivalent or trivalent alcohol is omitted.

COMPARISON EXAMPLE 2

The process of Example 1 is repeated except that 3.0 parts of organo-siloxane-oxyalkylene-block-copolymers corresponding to the following average formula

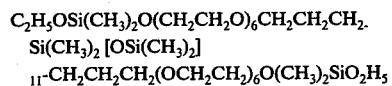

are substituted for the product obtained from the reaction of trimethylchlorosilane with propylene glycol. The following Table illustrates the properties of the compositions and the resultant elastomers.

TABLE

| | Stability (flow resistance) of compounds as per DIN 52454 | Properties - measured 7 days after applied to the foil | | | |
|---|---|---|---|---|---|
| | | Shore-hardness | | Elongation at fracture, DIN 53504 Spec. III percent | Modulus at 100% elongation, DIN 53504, Spec. III kp/cm² |
| | | Side exposed to air | Side adjacent to the foil | | |
| Example 1 | stable | 27 | 21 | not determined | not determined |
| Example 2 | stable | 29 | 15 | " | " |
| Example 3 | stable | 25 | 11 | 410 | 3.5 |
| Comparison Example 1 | unstable | 31 | 26 | 290 | 5.4 |
| Comparison Example 2 | stable | 29 | 26 | 340 | 4.5 |

EXAMPLE 4

A mixture consisting of 60 parts of dimethylpolysiloxane having in each of its terminal units an Si-bonded hydroxyl group and having a viscosity of 80,000 cP at 25° C., 30 parts of a trimethylsiloxy end-blocked dimethylpolysiloxane having a viscosity of 35 cP at 25° C., 75 parts of crushed quartz and 6 parts of pyrogenically produced silicon dioxide having a surface area of 130 m²/g, is mixed with 2.0 parts of the product obtained from the reaction of 1 mol dimethyldichlorosilane and 2.2 mols ethylene glycol. The resultant composition is then mixed with 8 parts of methyltris-(cyclohexylamino)-silane. The thus obtained composition is stored in tightly sealed tubes for 24 hours. Thereafter, samples are removed from the tubes and the flow resistance is determined. A coating 2 mm in thickness is applied to a glazed tile and then cured in the presence of atmospheric moisture.

After 7 days hammer blows are very carefully applied to the back side of the tile so as to fracture the tile without scattering the pieces which remain in contact with the elastomer. The pieces can then be moved away from each other by severl millimeters without tearing the coating. When the stress applied to separate the tile pieces is relaxed, the elastomeric coating contracts, thereby bringing the tile pieces back into close contact.

COMPARISON EXAMPLE 3

The process described in Example 4 is repeated except that the product obtained from the reaction of a halosilane and a bivalent alcohol is omitted. The compound thus obtained is not resistant to flow and when the tile pieces are separated by a few millimeters the coating tears.

COMPARISON EXAMPLE 4

The process described in Example 4 is repeated except that 2.0 parts of the organosiloxane-oxyalkylene-block-copolymer employed in Comparison Example 2 is substituted for the product obtained from the reaction of dimethyldichlorosilane with ethylene glycol. The product thus obtained is stable, i.e., it resists flow. However, the coating tears when the tile fragments are separated by a few millimeters.

The reaction products obtained from the halosilanes and bivalent or trivalent alcohols employed in Examples 1 through 4 are prepared in the following manner:

a. Reaction Product from Dimethyldichlorosilane and Ethylene Glycol

1. About 903 parts of dimethyldichlorosilane are added below the surface and over a period of about 1.5 hours to about 952 parts of ethylene glycol with constant agitation and under a pressure of 250 mm Hg (abs.) at room temperature while controlling the pressure in the reaction vessel so that it is at least 20 mm Hg below that of the surrounding pressure. The mixture is then heated to approximately 100° C. for 1.5 hours at a pressure which is approximately 20 mm Hg below environmental pressure and then allowed to cool to room temperature.

2. To a mixture containing 372 parts of ethylene glycol, 650 parts triethylamine and 1000 parts by volume of anhydrous toluene are added at room temperature and with constant agitation 387 parts of dimethyldichlorosilane over a period of 1.5 hours. Thereafter, the mixture is refluxed for 1 hour. The triethylaminohydrochloride is separated from the reaction mixture by filtration and washed with additional toluene. The toluene is then distilled from the combined filtrates at 12 mm Hg (abs.) and at 50° C. The resultant distillation residue is then filtered.

b. Reaction Product from Trimethylchlorosilane and 1,2-Propylene Glycol

The procedure described under (a)1 above is repeated except that 83.6 parts of 1,2-propylene glycol and 1085 parts of trimethylchlorosilane are substituted for the ethylene glycol and dimethyldichlorosilane.

c. Reaction Product from Diphenyldichlorosilane and Ethylene Glycol

About 1,265 parts of diphenyldichlorosilane are added below the surface of 680 parts of ethylene glycol over a period of 3.5 hours and at a pressure of 250 mm Hg (abs.) at 70° C. with constant agitation. The pressure in the reaction vessel is controlled so that it does not rise above about 20 mm Hg below the environmental pressure. Heat is then applied to increase the temperature up to about 150° C. at approximately 20 mm Hg below environmental pressure over a period of 3 hours and finally the mixture is allowed to cool to room temperature.

Although specific examples of the invention have been described herein, it is not intended to limit the invention solely thereto, but to include all the variations and modifications falling within the scope of the appended claims.

What is claimed is:

1. In an improved composition which is stable in the absence of moisture, but when exposed to moisture cures to a solid comprising a diorganopolysiloxane having terminal condensable groups, an organosilicon cross-linking agent having at least 3 groups per molecule selected from the class consisting of amino radicals, acylated amino radicals and oximo radicals, said amino radicals and acylated amino radicals are linked to the silicon atom via a nitrogen atom and said oximo radicals are linked to a silicon atom via an oxygen atom, the improvement which comprises that said composition also contains an organosilicon compound in which at least 75 percent of the number of silicon atoms are linked via an oxygen atom to a hydrocarbon radical in which the hydrocarbon radical is linked to one or two hydroxyl groups and the hydrocarbon radical may be linked to the same or different silicon atom via an oxygen atom.

2. The improved composition of claim 1 wherein the hydrocarbon radical is represented by the general formula $$-OCR'H[C(OH)_bR'_{2-b}]_cCHR'OH$$

in which R' is selected from the class consisting of hydrogen, a monovalent hydrocarbon radical and a substituted monovalent hydrocarbon radical, $b$ is 0 or 1, $c$ is a number of from 0 to 6, and when $c$ is a number of from 1 to 6 then only one unit of the formula $C(OH)_bR'_{2-b}$, where $b$ is 1 is present.

3. The improved composition of claim 2 wherein $c$ has a value of from 0 to 4.

4. The improved composition of claim 1 wherein the organosilicon compound is obtained by reacting an alcohol selected from the class consisting of bivalent and trivalent alcohols with a silane of the general formula $$R_aSiX_{4-a}$$

where R is selected from the class consisting of monovalent hydrocarbon radicals and substituted monovalent hydrocarbon radicals, X is a halogen and $a$ is a number of from 0 to 3.

5. The improved composition of claim 4 wherein the alcohols are represented by the general formula HOCR′H[C(OH)$_b$R′$_{2-b}$]$_c$CHR′OH in which R′ is selected from the class consisting of hydrogen, monovalent hydrocarbon radicals and substituted monovalent hydrocarbon radicals, $b$ is 0 or 1 and $c$ is a number of from 0 to 6.

6. The improved composition of claim 1 wherein the organosilicon compound is present in an amount of from 0.05 to 5 percent by weight based on the total weight of the composition.

7. The improved composition of claim 1 wherein the hydrocarbon radical is again linked via an oxygen atom to the same silicon atom.

8. The improved composition of claim 1 wherein the hydrocarbon radical is linked via an oxygen atom to a second silicon atom.

9. The improved composition of claim 1 wherein the hydrocarbon radical is linked to at least one hydroxyl group.

* * * * *